United States Patent [19]

Davis et al.

[11] Patent Number: 4,770,784

[45] Date of Patent: Sep. 13, 1988

[54] SCRUBBING PROCESS FOR HIGH FEED CONCENTRATIONS

[75] Inventors: James C. Davis, Hudson; Michael F. McGuiggan, Shaker Heights; Terry Berrett, Pepper Pike, all of Ohio

[73] Assignee: The Standard Oil Company, Cleveland, Ohio

[21] Appl. No.: 802,836

[22] Filed: Nov. 29, 1985

[51] Int. Cl.$^4$ .................. B01D 13/00; B01D 15/02
[52] U.S. Cl. .................. 210/638; 127/46.2; 127/54; 127/55; 210/639; 210/641; 210/644; 210/645; 210/648; 210/663; 210/683; 210/688; 210/805; 210/806; 210/905; 210/908; 210/912; 435/272; 435/276; 435/280; 435/281
[58] Field of Search .............. 210/632, 641, 638, 644, 210/639, 645, 648, 663, 665, 681, 683, 688, 805, 806, 905, 908, 912; 435/262, 272, 276, 280, 281; 127/46.2, 54, 55

[56] References Cited

U.S. PATENT DOCUMENTS

| | | | |
|---|---|---|---|
| 3,228,877 | 1/1966 | Mahon | 127/46.2 X |
| 3,519,558 | 7/1970 | Cooper IV et al. | 210/639 |
| 3,808,267 | 4/1974 | Davis et al. | 260/527 R |
| 4,163,714 | 8/1979 | Gregor | 210/639 |
| 4,474,690 | 10/1984 | Nylen | 260/112 R |
| 4,515,906 | 5/1985 | Friesen et al. | 521/28 |
| 4,563,337 | 1/1986 | Kim | 210/638 |

OTHER PUBLICATIONS

"Copper Selective Ion-Exchange Resin with Improved Iron Rejection" R. R. Grinstead, *Journal of Metals*, vol. 31, No. 3 (1979) 13–16.
"Membrane-Based Solvent Extraction for Selective Removal and Recovery of Metals" B. M. Kim, *Journal of Membrane Science*, 21 (1984) 5–19.

*Primary Examiner*—Richard V. Fisher
*Assistant Examiner*—W. Gary Jones
*Attorney, Agent, or Firm*—Sue E. Phillips; Joseph G. Curatolo; Larry W. Evans

[57] ABSTRACT

A scrubbing process for high feed concentrations of different materials in liquid streams. The process calls for providing a porous membrane in a cell, the membrane having pores of sufficient dimension to allow passage of the different materials therethrough; providing a first stream comprising the different materials in a liquid carrier, providing a second stream comprising an affinity adsorbent in a second liquid carrier, wherein the affinity adsorbent has a dimension larger than that of the pores and has a preferred binding capacity for at least one but not all of the different materials; mixing the first and second streams together to form a composite mixture wherein a portion of the different materials become bound to the affinity adsorbent and a portion of the different materials remain essentially unbound to the affinity adsorbent; and passing the composite mixture against a first side of the membrane while passing a liquid carrier for any of the unbound material against a second side of the membrane to produce a first exit stream containing the affinity adsorbent and a high concentration of at least one of the different materials and a second exit stream containing the liquid carrier and a high concentration of at least one of the other different materials.

7 Claims, 1 Drawing Sheet

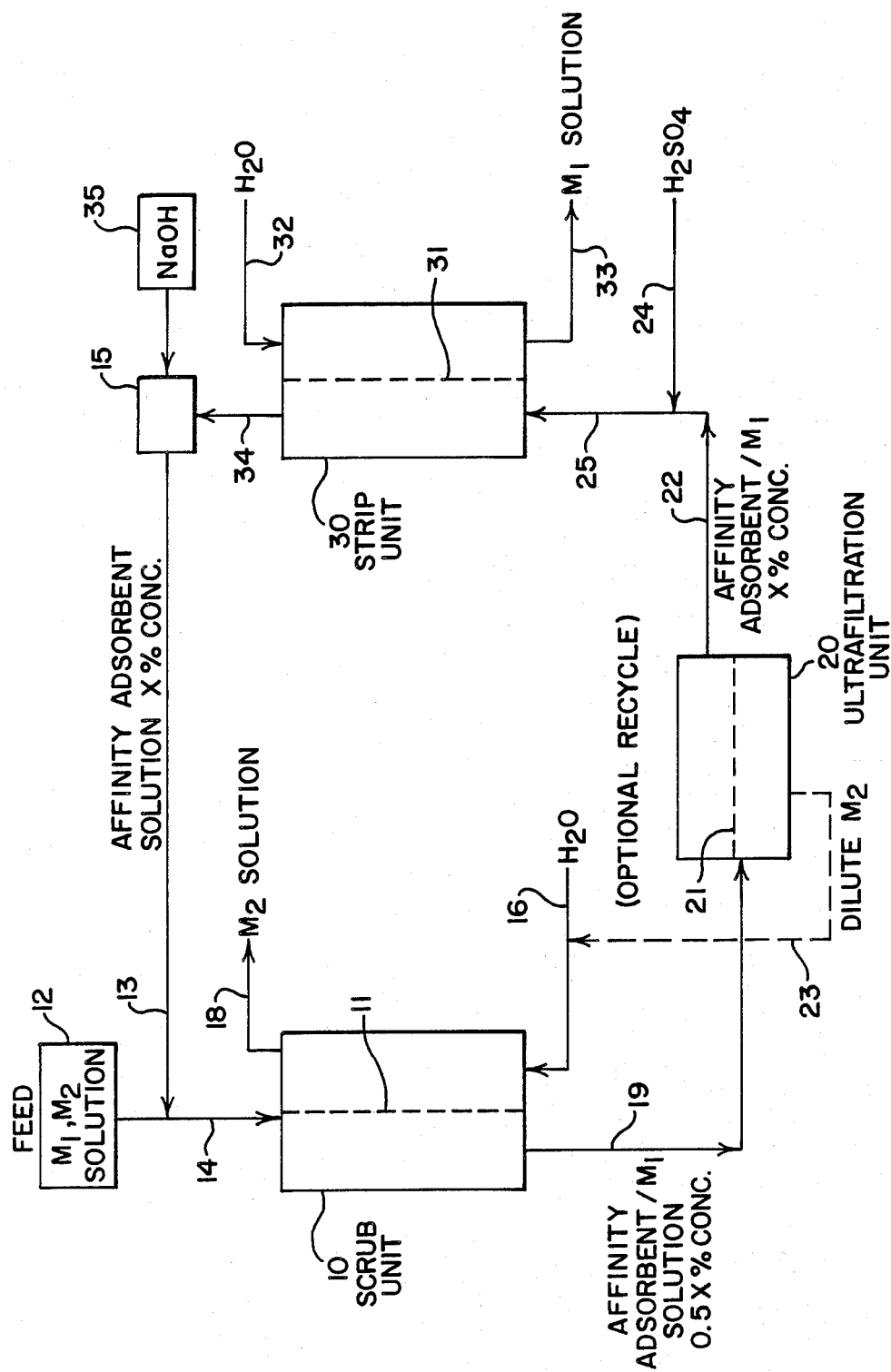

SCRUBBING PROCESS FOR HIGH FEED CONCENTRATIONS

TECHNICAL FIELD

Affinity dialysis is a useful process for the selective removal of ionic and organic species or particles from solutions, streams and the like. Generally, any flow stream which contains a desirable material or a contaminant material, for which a known adsorbent exists, can be treated with that process for separation and removal of specific materials.

However, when using affinity dialysis to separate components of high concentration streams, the feed stream must be diluted to a lower concentration or an oversized affinity dialysis unit must be employed or both. The process of the present invention employs elements of the affinity dialysis process and is particularly useful for the concentration of metal ions.

BACKGROUND ART

The known art for the selective extraction of desired materials from feed streams falls into three general categories. First among these is resin bead extraction typified by ion exchange resins which have been used selectively to extract species such as transition metal ions from aqueous solutions. Specific chelating resins with selectivity for one or more desirable metal ions are also known but are difficult to manufacture, are consequently expensive, and suffer from severe bead attrition due to physical breaking up of the beads in flow systems. The difficulty of attaching desirable chelating groups to available macroporous resin beads limits the quantity and selectivity of the materials which can be made using this technique.

One relatively recent publication "Copper-Selective Ion-Exchange Resin with Improved Iron Rejection" R. R. Grinstead, *Journal of Metals*, Vol. 31, No. 3 (1979) 13–16, describes a then improved chelating resin for copper/iron ion solutions, highly selective for copper.

A second process involves solvent extraction which is typically used to recover mineral values employing selective extractants soluble in solvents, immiscible with the feed solvent. Large volumes of solvent and extractant inventory are required, however, and valuable extractant is commonly lost due to solubility in the feed stream and entrainment losses resulting from microfine solvent/extractant particles which do not coalesce in the solvent/feed separators.

More recently, patent and open literature references have suggested the use of membranes as separators to avoid the solvent/extractant losses due to entrainment.

U.S. Pat. No. 3,808,267 teaches a membrane process for recovery of $C_2$ to $C_4$ carboxylic acids from dilute aqueous solution with one side of a microporous membrane while the other side is contacted with a liquid organic solvent for the acid.

"Membrane-Based Solvent Extraction for Selective Removal and Recovery of Metals", B. M. Kim, *Journal of Membrane Science*, 21 (1984) 5–19, describes a process for stripping industrial metals from wastewater. The process employs two modules, the first being for extraction through which the aqueous waste water stream flows, routed through thousands of very thin hollow fibers. An organic solvent containing a liquid ion-exchange material flows between the fibers and collects metal ions migrating through the pores in the fibers. The organic solvent stream then flows through a stripping module wherein an acid, base or salt solution, as appropriate, removes the metal ions.

In both cases these references discuss the use of immiscible solvents as the means of separating the extractant from the feed stream since the extractants used are small enough to permeate through the membranes employed. Both solvent and extractant soluble losses do occur in these systems and result in organic pollution of the feed stream.

Membrane methods comprise the third category for the selective removal of materials from solutions. In most instances these methods have been pressure driven ultrafiltration or reverse osmosis processes as opposed to the affinity dialysis process which is concentration gradient driven. U.S. Pat. No. 4,163,714 describes the preparation of pressure driven affinity adsorption membranes from a membrane filter which is composed of an insoluble matrix polymer or interpolymer complex. The membranes are employed by passing material-containing solutions therethrough where one or more of the materials forms a complex with the ligand on the membrane pore surface and is subsequently displaced in a concentrated state.

In any pressure driven process with a polymeric material or suspension, a process known as concentration polarization occurs which results in substantial loss of permeation due to fouling of the membrane surface. This phenomenon limits the concentration of polymer or suspended absorbent which can be efficiently used.

U.S. Pat. No. 4,474,690 is directed toward a method for recovering peptide-containing compounds from solution and employs a carrier and a ligand selected for biospecific affinity for the peptide-containing compounds. The method employs a semipermeable membrane and pressure to drive the peptide-containing compound to the carrier/ligand complex across the membrane after which the peptide-containing compound is stripped from the complex.

Despite the widespread existence of different processes for the selective extraction of various materials, the art has not recognized heretofore a scrubbing process wherein feed stream solutions containing mixtures of dissolved metal ions or other different materials can be treated in high concentrations.

SUMMARY OF THE INVENTION

In general, the present invention is directed toward a scrubbing process for high feed concentrations of different materials in liquid streams which comprises the steps of providing a porous membrane in a cell, which membrane has pores of sufficient dimension to allow passage of different materials therethrough, providing a first stream of the different materials in a liquid carrier and providing a second stream of an affinity adsorbent in a second liquid carrier, wherein the affinity adsorbent has a dimension larger than that of the membrane pores and has a preferred binding capacity for at least one but not all of the different materials. The next step includes mixing the first and second streams together to form a composite mixture wherein a portion of the different materials become bound to the affinity adsorbent and a portion of the different materials remain essentially unbound to the affinity adsorbent. The process concludes by passing the composite mixture against a first side of the membrane while passing a liquid carrier for any of the unbound material against a second side of the membrane to produce a first exit stream containing the affinity adsorbent and a high concentration of at least one of the different materials and a second exit stream containing the liquid carrier and a high concentration of at least one of the other different materials.

BRIEF DESCRIPTION OF THE DRAWING

The drawing depicts a schematic diagram of the scrubbing process of the present invention.

PREFERRED MODE FOR CARRYING OUT THE INVENTION

As noted hereinabove, the scrubbing process of the present invention is useful with affinity dialysis and shares common elements therewith. The affinity dialysis process referred to is described in full details in a co-pending application, U.S. Ser. No. 742,872, commonly owned by the Assignee of record. That process is usable for the selective dialysis of liquid streams containing different materials such as but not limited to metal ions and includes the steps of providing a porous membrane in a cell, which membrane has pores of sufficient dimension to allow passage of different materials therethrough, and then circulating an affinity adsorbent stream against a first side of the membrane wherein the adsorbent has a dimension larger than that of the pores and has a preferred binding capacity for at least one but not all of the different materials. The process continues by passing the liquid stream containing the different materials against a second side of the membrane whereby certain of the materials become bound to the affinity adsorbent upon passing through the membrane to the first side thereof in a concentration greater than their concentration in the liquid stream and become separated from others of the materials which can return to the second side of the membrane.

Affinity dialysis, as such, is somewhat limited by the concentration of different materials that can be present in the feed stream. Where, for instance, the materials are metal ions, e.g., copper and zinc, affinity dialysis is quite suitable for concentrations of up to about 20,000 ppm. However, where the concentrations of metal ions are present in significantly greater concentrations, e.g., 7 to 10 weight percent, affinity dialysis is not expedient but rather instead, the scrubbing process of the present invention is employed.

Practice of the process of this invention requires two components, a porous membrane and an affinity adsorbent which is selected for its preferred affinity to chelate or otherwise combine with the material or materials that are to be separated from other material or materials in a liquid flow stream. These elements are shared in common with affinity dialysis as set forth in U.S. Ser. No. 742,872.

That process is particularly suitable for counter current mode operation where the feed stream laden with a mixture of materials is passed through the membrane device such as, for instance, through the lumen of a bundle of hollow fibers, and the affinity adsorbent is outside the fibers, flowing in the opposite direction, typically in reduced volume compared to the feed or vice-versa. Materials from the feed stream diffuse freely through the membrane pores; those that complex with the affinity adsorbent cannot return and remain outside of the membrane The affinity adsorbent exits carrying a large concentration of at least one material, the concentration of which is significantly lowered in the feed stream.

The present process differs from the foregoing affinity dialysis process by the addition of the affinity or polymer adsorbent directly to the feed stream. At least one of the two dissimilar materials in the feed stream becomes bound to the adsorbent either exclusively or in significantly greater concentrations than the second material. This mixture of polymer adsorbent/bound material and unbound material is then fed to a cell where it encounters a semipermeable membrane.

The latter membrane has pores large enough for passage of the unbound material(s) but restrictive to the passage of the polymer adsorbent complex. The mixture is readily dialyzed with a liquid carrier for the unbound material such as dionized water whereupon the polymer adsorbent/bound material exits the cell in a separate stream from the water which now carries the unbound material.

More specifically, several requirements exist for the membranes utilized in this process. They must be substantially impermeable to the affinity adsorbent extractant, they must be substantially permeable to at least one of the materials, the unbound material, and they must also be relatively chemically and physically stable in the process streams being treated. The desired membranes should also not be strong adsorbents of either the adsorbed species or the adsorbent being used. Typical dialysis membranes such as those commonly used in artificial kidneys are good examples of membranes suitable for this process. Such membranes can be made from a variety of polymers including, but not restricted to, cellulosics including regenerated cellulose, polyphenylene oxides, polysulfones, polyvinylidine halides, polyolefins, polycarbonates, polyimides, polyvinyl alcohol, fluorocarbon polymers, polyacrylonitrile and common substituted analogs thereof as well as copolymers of any of the foregoing. The form of membrane selected does not constitute a limitation of the process inasmuch as both hollow fibers and flat sheets can be employed.

Similarly, a wide variety of adsorbent materials may be utilized for practice of the subject invention. Requirements for these materials as noted hereinabove, are that they be too high in molecular weight to diffuse readily through the membrane and that they have a selective affinity for at least one species of dissimilar material over another in a mixture thereof. The adsorbent material may be soluble in, suspended in or otherwise carried along by the fluid on the product side of the membrane which carries the dissimilar materials and should be capable of being stripped of the desired species by one of several means.

For example, the adsorbent solution may be used without further treatment as feed to a conventional recovery system such as a roaster for metals beneficiation, or it may be treated with chemicals, heat, pH change, electrolytic means or other means to destroy the complex formed and then the desired materials are separated by conventional means or by use of another membrane step, either dialysis or ultrafiltration.

In complex systems of feed components, multiple adsorbents may be used in the same unit to extract several desirable materials which may then be easily separated by those techniques mentioned above, particularly where significant concentration is achieved. Alternatively, appropriately designed adsorbents may selectively release their bound materials under different conditions such as pH thereby effecting a further separation. Such an enhanced separation may also be possible in this invention with a generally selective adsorbent which can be induced to release its complexed material selectively.

Example materials for adsorbents include six classes of materials: chelating or ion exchange polymers; biological polymers and cells that are highly selective to binding small molecules such as organic materials; ground small particle ion exchange resins; activated charcoal; natural and synthetic ion exchange materials; and, enzymes which utilize as co-factors certain organic compounds. Exemplary ion exchange polymers include sulfonated polyolefins, polyethylenimine, polyacrylic acid based compounds, chelating polymers known to the art and envisioned based on known chelation behavior and known polymer backbones.

Ion exchange resins are well known, one typical example being exemplified hereinbelow. These are preferably ground to a small particle size to increase surface area but not as small as to be able to pass through the pores of the membrane employed. Where a hollow fiber polymer membrane is employed, the resins should be ground to at least 0.1 of the diameter of the fiber lumen. Suitable resins for this purpose include XFS 43084 and XFS 4196 from Dow Chemical. Both are based on picolylamine (2-aminomethylpyridine) and are described as macroporous polystyrene/divinylbenzene copolymers to which has been attached a chelating functional group. Their structures are as follows:

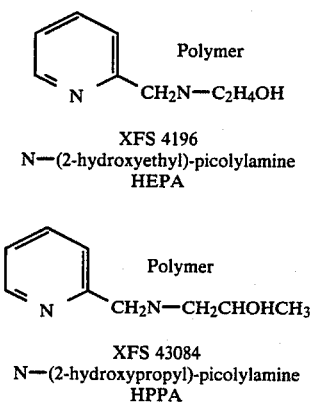

XFS 4196
N—(2-hydroxyethyl)-picolylamine
HEPA

XFS 43084
N—(2-hydroxypropyl)-picolylamine
HPPA

Most of the foregoing affinity adsorbents are water soluble materials but practice of the present invention does not necessarily exclude either insoluble materials such as finely divided ion exchange resins, activated charcoal and natural and synthetic ion exchange resins or materials used in nonaqueous systems to which the dialysis process described herein may be applicable.

The adsorbent material is carried by a solvent which is either water or a nonaqueous, organic media such as alcohols, aromatic solvents or chlorinated solvents, although water is preferred due to its availability and the fact that it is not likely to pollute as would an organic solvent. Where an organic solvent is employed, e.g., separation of amino acids which are soluble in alcohol, the alcohol solvent must be capable of solvating or suspending the adsorbent but not dissolving the membrane. The adsorbent is generally dissolved in the solvent to a maximum concentration which will vary as the adsorbent and solvent vary, as well as practical limitations due to viscosity. Inasmuch as the process of the present invention is not based on or related to solvent extraction, it will be understood that the solvent carrier of the feed stream is approximately the same as the solvent for the adsorbent which is to say they are miscible.

The type of materials that can be removed or extracted by the dialysis process of this invention includes ionic species, both anions and cations, and organic species such as organic and biological solutes. More particularly, substantially any anions such as carboxylates, chromates, nickel, zinc or gold cyanide complexes from plating wastes and the like can be treated to extract selected materials; cations as well, particularly transition metal ions, as may be present in common plating wastes, e.g., nickel or zinc ions, rare earth metals, metals in photographic processes, liquors from mining operations and many others can also be treated to extract specific metals. A wide variety of organic and biological materials can also be treated including amino acids, sugars, optical isomers, fuels and the like contaminated with salts, water or other impurities.

The term different materials is employed herein to connote differences in species, e.g., copper from zinc; chromate from chloride as well as differences in genuses, e.g., water or salts from organic fuel, and should be understood to mean that in any combination of two or more materials, at least one material can be extracted or separated from another in a stream where all are present. It is to be understood that practice of the present invention does not require the use of any specific affinity adsorbent material; polymer, ion exchange resin or enzyme; semipermeable membrane or solvent or combination thereof that would be universal for ionic species as well as organic. On the contrary, an advantage of the process is that selection of any one or more of these three variables can be tailored exactly to the separation that is desired, taking into account the composition of the feedstream.

A brief summary of the range of physical characteristics within which the process of this invention is believed to be applicable is set forth in Table I.

TABLE I

| | | Conditions for Practice of Scrubbing Process | | |
|---|---|---|---|---|
| Component | Form | Determining Characteristic | Broad Range | Preferred Range |
| Adsorbent | Polymeric | Mw[a] | 3K[b] to 3 Million | 5K to 50K |
| Adsorbent | Solid - Susp. | Size | 0.01 to 5 Micron | 0.1 to 0.5 |
| Membrane | Porous | Mw Cutoff | 1000 to Solids | 2K to 10K |
| Solvent | Liquid | Type | $H_2O$ or Organic | Aqueous |
| Adsorbant | Dissolved | Type | Ionic to Organic | Ionic |
| Adsorbant | Dissolved | Mw | 18 to 50K | 40 to 1000 |

[a]Molecular weight
[b]× 1000

In the exemplary work reported hereinbelow the scrubbing process of the present invention was practiced utilizing membranes and polyethylenimine (PEI) polymer adsorbent for the extraction of copper from zinc ions. Several of the procedures have been set forth with a brief discussion of the apparatus employed.

Hollow fiber units normally provided as artificial kidneys by Haspal, Inc. as Model DISSCAP 140 and/or 080 were used. The fibers were manufactured from regenerated cellulose. The hollow fiber units which had plastic cases, contained 8000 or 14,000 square cm of membrane and had tubesheets made of polyurethane. Hollow fiber membranes were flushed by pumping distilled water through both sides of the fiber units for 10 minutes prior to use and were kept wet thereafter. All membranes and membrane units were stored in a preservative of 2 percent formaldehyde when not in use.

With reference to the drawing, an explanation regarding operation of the scrubbing process shall be set forth. The scrubbing unit, indicated by the numeral 10 comprises a membrane cell, hollow fiber unit or other, which is provided with a semipermeable membrane 11. An aqueous feed 12 of two or more dissimilar materials, herein listed as $M_1$ and $M_2$, is combined with the polymer adsorbent stream 13, mixed and then fed via line 14 to the unit 10. Polymer adsorbent 13 is fed from a regeneration stage 15, discussed hereinbelow, or from a separate supply not shown.

Once inside the cell 10, a separate carrier for the unbound materials such as deionized water is fed at 16 across the opposite side of the membrane 11. Although a counter current arrangement is depicted, other cell arrangements may be suitable. Inside the cell 10, dialysis occurs and all unbound material $M_2$ as well as any unbound soluble waste materials exit the cell via stream 18, while the polymer adsorbent and bound material $M_1$ exit via stream 19.

Stream 19 next passes to a second cell 20 or ultrafiltration unit which contains a membrane 21, that can be the same or different membrane substance as membrane 11. The purpose of ultrafiltration unit 20 is to concentrate the affinity adsorbent solution to its original level. If for instance, stream 13 were initially concentrated at 30 percent by weight, upon leaving the scrub unit 10, stream 19 would desirably be diluted by about 50 percent, to a 15 percent solution, assuming an equal volume of feed solution 12 had been fed. Rather than return a 15 percent solution to the scrubbing unit, the unit 20 removes solvent by about 50 percent so that the exit stream 22 again provides a 30 percent concentration for subsequent use. In order to improve further the efficiency of the process, in terms of bound $M_1$ concentration to the affinity adsorbent, a separate stream 23, containing the unbound material $M_2$, can optionally be recycled from unit 20 to the water stream 16 to enter scrubbing unit 10 therewith.

Returning to stream 22 exiting ultrafiltration unit 20, this stream is fully concentrated to the original level of affinity adsorbent and, it carries all of the bound $M_1$ material. If desired, the bound material $M_1$ can optionally be stripped from the adsorbent in a separate strip step performed in strip cell or unit 30.

In order to remove $M_1$, for instance, stream 22 is adjusted so that $M_1$ is no longer bound to the affinity adsorbent. When $M_1$ is a metal ion, for instance, pH is adjusted to about 1 to 3 with acid from stream 24. Concentrated $H_2SO_4$ is depicted but other strong mineral acids can be substituted therefor. The lowering of the pH causes the bound metal ion $M_1$ to be freed from the affinity adsorbent at which point stream 25 enters the cell 30 also containing a stripper membrane 31 which can be the same or different membrane as 11 or 21. Deionized water is fed into the cell 30 via line 32, the material $M_1$ diffuses through the membrane 31 and solubilizes in the water and exits from cell 30 via line 33.

Finally, the adjusted affinity adsorbent, stream 4, is regenerated with a strong base 35 such as NaOH, in regeneration unit 15 to raise the pH to a level where it will again bind with the material $M_1$. At this point, the adsorbent stream 13 is again fed to the feed stream from 12 and the scrubbing process continues. Of course, where the bond is created in an acidic environment, the pH would be appropriately raised with a base to release $M_1$ after which regeneration with an acid would take place in the same manner as has been described hereinabove, but with the substitution of a base for the acid and likewise an acid for the base.

It will be appreciated that the process may be terminated after the scrubbing step in unit 10 in those instances where one or both of the exit streams 18, 19 have utility without further processing or where the value of the process is in separating $M_1$ from $M_2$ and freeing $M_1$ from the affinity adsorbent is not warranted economically.

With reference to the foregoing drawing, the two examples which follow demonstrate utility of the process in the separation of copper from zinc ions employing a solution containing cupric chloride and zinc chloride. It is to be understood that practice of the present invention is not, however, limited to any of the units depicted in the drawing or otherwise discussed herein. Rather, these have been described only to detail the exemplification provided hereinbelow.

EXAMPLE NO. 1

For this separation, the scrub unit (10) and strip unit (30) each comprised cellulose hollow fibers (Hospal artificial kidney model Disscap 140); the ultrafiltration unit or concentrator (20) comprised an Amicon Model DC 2 ultrafiltration unit with polysulfone hollow fibers (21) and the affinity adsorbent (13) was 5% PEI. The system was fed a feed stream comprising 12,300 ppm Cu ion ($M_1$) and 4524 ppm Zn ion ($M_2$) for several hours. Flow rates (ml/hr) and metal ion concentrations for streams 14, 23, 33 and 18 are reported in Table II. The values appearing in parentheses are the percent of the given metal based on the total metal in the particular stream.

TABLE II

| | | $Cu^{2+}$ From $Zn^{2+}$ Separation with PEI | | | |
|---|---|---|---|---|---|
| | Flow | Cu | | Zn | |
| Stream | (ml/hr) | ppm | % | ppm | % |
| 14 | 160 | 12,300 | (73) | 4524 | (27) |
| 23 | 205 | 91 | (6) | 1400 | (94) |
| 33 | 430 | 6680 | (85) | 1200 | (15) |
| 18 | 475 | 18 | (4) | 418 | (96) |

By combining streams 23, from the ultrafiltration unit 20, and 18, from the scrub unit 10 and adjusting flow rates, effluent zinc recovery was found to be 63% of total zinc present at 95% purity. Corresponding, stream 33, from the strip unit 30 contained 99% of the copper after adjustment of flow rate and was 85% pure.

EXAMPLE NO. 2

This example exployed the same system as in Example No. 1 and was run continuously for several hours. The data collected and reported in Table II are the averages of four samples taken over a three hour period. The system had run for several hours prior to the time the samples were taken to ensure that steady state had been reached. The only changes not shown were a decrease in the PEI concentration at 15 and corresponding changes in flow rates as noted in Table III which follows.

TABLE II $Cu^{2+}$ From $Zn^{2+}$ Separation with PEI

| Stream | Flow (ml/hr) | Cu ppm | Cu % | Zn ppm | Zn % |
|---|---|---|---|---|---|
| 14 | 275 | 2487 | (73) | 939 | (27) |
| 23 | 440 | 19 | (17) | 94 | (83) |
| 33 | 990 | 631 | (86) | 102 | (14) |
| 18 | 1170 | 22 | (21) | 84 | (79) |

By normalizing all the streams to stream 14 and taking stream 33 as the copper product stream, 95% of the copper was found in that stream at a purity of 86%, while streams 23 and 18 were combined to give 58% of the zinc at 81% purity.

Based upon the foregoing disclosure it should be readily apparent that the process of the present invention is useful for the concentration of one or more materials from feed streams containing different materials. The process has been demonstrated to have utility in the concentration and separation of metal ions and is capable of both concentrating from solution mixtures as well as exhibiting selectivity to one species over another.

The scrubbing process is operable with nearly an infinite number of porous or semipermeable membranes and affinity adsorbent solutions, the latter being selected principally for the chelating or binding properties they have in conjunction with the materials to be separated from the feed stream. It should be understood that variations in the operation such as continuous modes, counter current modes and recycling are included in the present invention as well as the use of mixtures containing several different affinity adsorbents.

In like fashion the scrubbing process can be employed in additional steps such as stripping of the loaded adsorbent and regenerating the adsorbent following stripping. Inasmuch as all of these processes can be practiced in a variety of membrane apparatus including artificial kidneys as well as other types of dialysis units, units such as the Amicon cell discussed herein, hollow fiber units, countercurrent flow units and the like, it is to be understood that practice of the present invention is not to be limited to any specific form of apparatus.

In conclusion, the examples set forth herein are merely illustrative of operability and are not to be construed as limiting practice of the process to the separation of copper from zinc and the like or as favoring polyethylenimine as the affinity adsorbent. It is to be understood that any variations evident fall within the scope of the claimed invention; therefore, the selection of specific component members or ingredients can be determined without departing from the spirit of the invention herein disclosed and described. Moreover, the scope of the invention shall include all modifications and variations that may fall within the scope of the attached claims.

We claim:

1. A scrubbing process for high feed concentrations of different materials in liquid streams comprising the steps of:

providing a porous membrane in a first cell, said membrane having pores of sufficient dimension to allow passage of said different materials therethrough;

providing a first stream comprising said different materials in a liquid carrier;

providing a second stream comprising an affinity adsorbent in a second liquid carrier, said affinity adsorbent having a dimension larger than that of said pores and having a preferred binding capacity for at least one but not all of said different materials;

mixing said first and second streams together to form a composite mixture wherein a portion of said different materials become bound to said affinity adsorbent and a portion of said different materials remain essentially unbound to said affinity adsorbent;

passing said composite mixture against a first side of said membrane while passing a separate liquid carrier for any of said unbound material against a second side of said membrane to produce a first exit stream containing said affinity adsorbent and a high concentration of at least one of said different materials and a second exit stream containing said separate liquid carrier and a high concentration of at least one said other different material;

providing a porous stripper membrane in a separate cell, said membrane having pores of sufficient dimension to prevent passage of said affinity adsorbent and said bound materials therethrough;

concentrating said first exit stream by removing a portion of said first and second liquid carriers therefrom;

combining a stripper reagent with said concentrated exit stream to form a second mixture wherein said bound materials are freed from said affinity adsorbent; and passing said second mixture against a first side of said stripper membrane of said separate cell while passing a liquid carrier for any of said freed material against a second side of said stripper membrane whereby said freed material passes through said stripper membrane and out of said separate cell at one end and said affinity adsorbent passes out of said separate cell at a second end in a stream.

2. A process as set forth in claim 1, wherein said different materials are selected from the group consisting of anions, cations and biological and organic materials and various mixtures thereof; and wherein said affinity adsorbent has a molecular weight greater than the molecular weight cut off defined by the size of said pores and is selected from the group consisting of chelating polymers, biological polymers and cells that are highly selective to binding small molecules, ground ion exchange resins, activated charcoal, natural and synthetic ion exchange materials and enzymes.

3. A process as set forth in calim 2, wherein said affinity adsorbent comprises chelating polymers which are selected from the group consisting of sulfonated polyolefines, polyethylenimine, poly(2-acrylamido-2-methylpropanesulfonic acid) and other polyacrylic acids.

4. A process as set forth in claim 1, wherein said stripper reagent is selected from the group consisting of $Cu^{2+}$ ions, acids capable of lowering the pH of said affinity adsorbent stream to about 4 or lower and bases capable of raising the pH of said affinity adsorbent stream to at least 8.

5. A process as set forth in claim 1, comprising the further step of feeding a small quantity of said first and second liquid carriers to said first cell with said separate liquid carrier.

6. A process as set forth in claim 1, wherein said porous membranes are selected from the group consisting of cellulosics, polyphenylene oxides, polysulfones, polyvinylidene halides, polyolefins, polycarbonates, polyimides, polyvinyl alcohol, fluorocarbon polymers, polyacrylonitrile and common substituted analogs thereof and copolymers thereof.

7. A process as set forth in claim 1, comprising the further step of:

adding a regenerating reagent to said affinity adsorbent stream selected from the group consisting of bases capable of raising the pH thereof to about 5 or higher and acids capable of lowering the pH thereof to about 7 or lower; and thereafter returning said affinity adsorbent stream to said first cell.

* * * * *